(No Model.)
J. R. NORTHRUP.
SIDE SPRING VEHICLE.
No. 348,926. Patented Sept. 7, 1886.
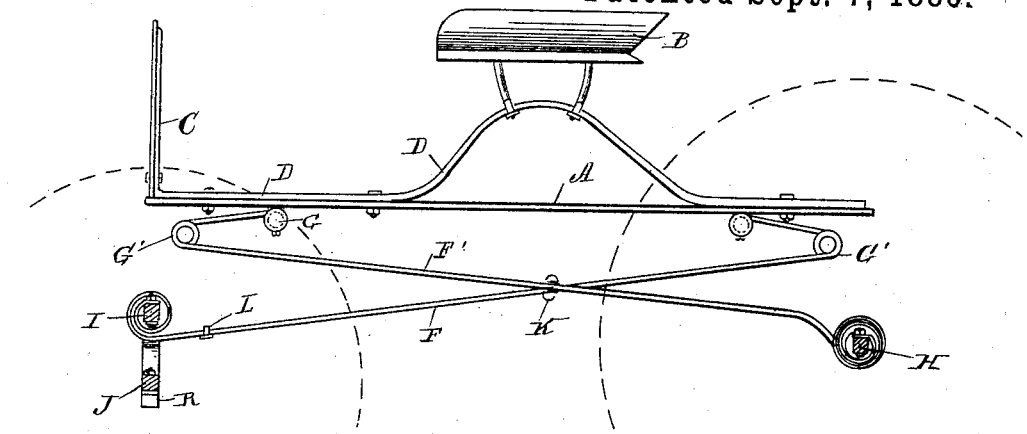
Fig. 1.
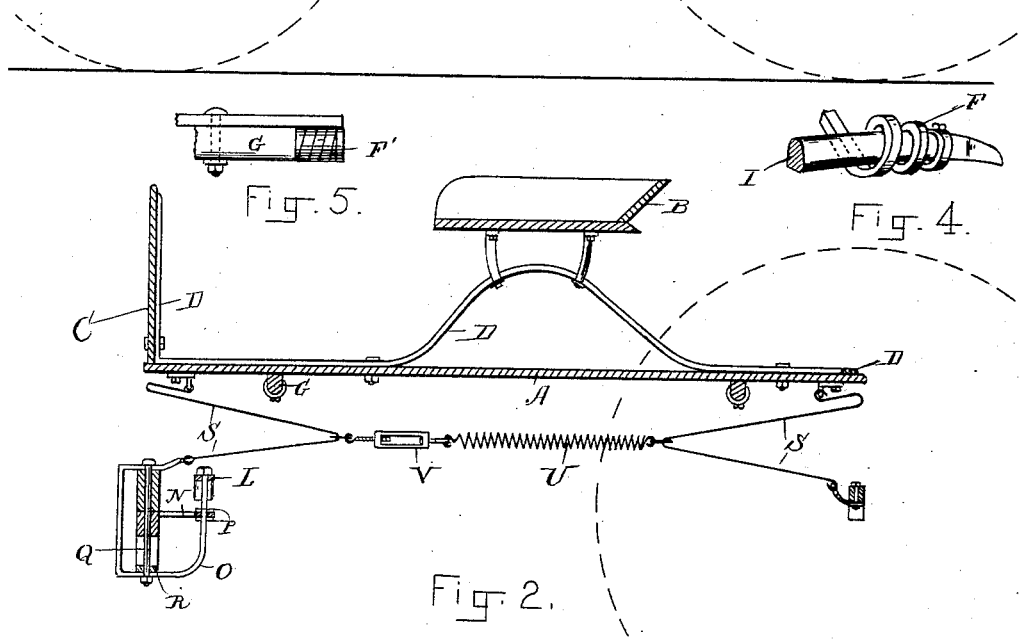
Fig. 5. Fig. 4.
Fig. 2.
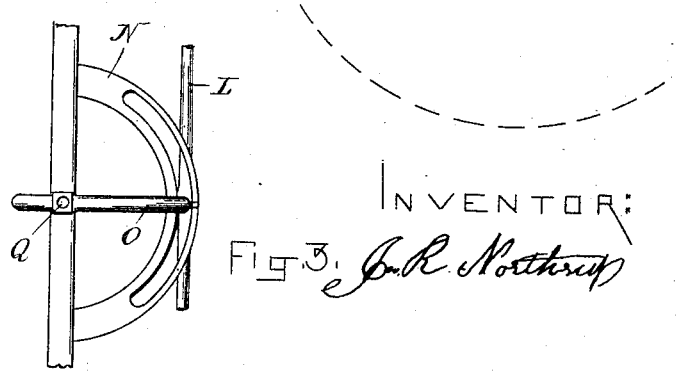
Fig. 3.
Witnesses:
C. S. Gooding
J. G. Perry
Inventor:
J. R. Northrup

UNITED STATES PATENT OFFICE.

JAMES R. NORTHRUP, OF ROCKY BROOK, RHODE ISLAND.

SIDE-SPRING VEHICLE.

SPECIFICATION forming part of Letters Patent No. 348,926, dated September 7, 1886.

Application filed January 25, 1886. Serial No. 189,580. (No model.)

*To all whom it may concern:*

Be it known that I, JAMES R. NORTHRUP, formerly of Galt, California, but now of Rocky Brook, in the county of Washington and State of Rhode Island, have invented certain new and useful Improvements in Wagons and other Vehicles, of which the following is a specification, reference being had to the accompanying drawings, making part of the same.

My invention relates to wheeled vehicles, and especially to an improved construction of the springs, whereby increased elasticity is secured, and to a novel form of fifth-wheel, serving to lessen friction and improve the practical working of the running-gear. The combination and relative arrangement of these parts of the vehicle is also a part of my invention; and another feature of it is the means for longitudinal adjustment of certain of the springs. The continuous side rail supporting the seat and dasher is another new feature.

My invention consists in the devices and combination of devices set forth in the appended claims.

In the drawings, Figure 1 is a side view of my improved vehicle, the wheels indicated by dotted lines showing the peculiarity of the side springs coiled at their ends around the axles and cross-trees. Fig. 2 is a longitudinal section of the vehicle, omitting the wheels and side springs for greater clearness. Figs. 3, 4, and 5 are details of the fifth-wheel and of the spring ends and the cross-pieces to which the springs are secured.

The body A, seat B, and dasher C may be of any ordinary construction. I prefer to mount the seat on the upwardly-bent side rails, D, which are secured to the edges of the body A, near their ends, and connected to each other across the rear end of the body by a continuation of said rail. Its turned-up ends also support the dasher. This arrangement of parts is advantageous, because it gives a broad base for support of the seat over the entire body A, which may therefore be much lighter than where the strain of the weight carried is more concentrated. The crossing of the rail at the rear end keeps the body A from splitting.

The springs F F are of peculiar construction. They are formed in pairs, and run lengthwise of the body A, about in the vertical plane of the side rails, D. Each spring F is attached to and preferably coiled at one end around a cross-piece, G, on which the body rests. Then after making one coil, G', the springs extend obliquely, and one of each pair is carried spirally around the rear axle, H, and secured to it, while the other runs in the opposite direction and is at its front end coiled around the cross-tree I, which rests upon the raised central portion of the forward axle, J. This formation of the springs gives a high degree of elasticity and distributes the strain, so as to lessen the liability of breakage. A fender, K, is introduced between the springs, and secured to either one to prevent friction at their point of junction. Near their forward ends the two innermost springs F are connected crosswise by a tie-rod, L, Fig. 3, which holds them in proper relation to each other. The ends of this tie-rod are bent or provided with staple-like loops passing around the springs F, so as not to weaken the springs by a perforation through the steel.

The fifth-wheel differs widely from those in common use. The segment N, secured to the forward axle, J, has a semicircular slot in it, through which passes a bent bar, O, having shoulders P above and below the segment. This bar O extends from the tie-rod L downwardly through said slot, and forward to the prolonged king-bolt Q at its junction with the supporting-bar R, which crosses beneath the raised portion of the axle J. The bent bar O is continued upwardly in front of the axle J, and again rearwardly at the top of the cross-tree I, where the head of the king-bolt rests upon it. Beneath the longitudinal center of the vehicle, I place two V-shaped springs, S, Fig. 2, one at the rear extending from the axle H inwardly and again outwardly with a terminal reverse curve to its point of fastening to the bottom of the body A. The other spring, S, of like form, connects the body with the cross-tree I by fastening the lower end of said spring to the extremities of the bent bar O, just in rear of the king-bolt. The two springs S are connected by a spiral spring, U, and a turn-buckle, V, by means of which a longitudinal adjustment is secured, which permits a variation in tension according to the weight to be carried in the vehicle.

Having thus described my improvement for wagons and other vehicles, I claim—

1. In combination with the body and running-gear of a vehicle, the supporting-springs F F', arranged at each side of the vehicle-body in parallel planes, the springs of each pair placed obliquely to each other, and each spring coiled at one end around and secured to the axle of the vehicle and at the other end around and to the cross-tree, substantially as set forth.

2. The body A, seat B, and dasher C, in combination with the continuous rail D, secured marginally to the body and raised to support the seat and dasher, substantially as set forth.

3. The oblique springs F, connected transversely by the tie-rod L, in combination with the slotted segment N, shouldered bar O P, and the king-bolt Q, substantially as set forth.

4. The axle J, supporting-bar R, king-bolt Q, and segment N, in combination with the bent bar O, provided with shoulders P, to engage with said segment and with the tie-rod L, supporting said bent bar, substantially as set forth.

5. The V-shaped spring S, arranged beneath the front and rear ends of the body in the plane of its longitudinal center, in combination with the spiral spring U and turn-buckle V, adjustably connecting the springs S, substantially as set forth.

JAMES R. NORTHRUP.

Witnesses:
J. G. PERRY,
H. P. PERRY.